US011332081B2

(12) United States Patent
Choi

(10) Patent No.: US 11,332,081 B2
(45) Date of Patent: May 17, 2022

(54) STRUCTURE OF A SLIDING TRIM COVER FOR OPPOSITE SLIDING DOORS

(71) Applicants: HYUNDAI MOTOR COMPANY, Seoul (KR); KIA MOTORS CORPORATION, Seoul (KR)

(72) Inventor: Je-Won Choi, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 185 days.

(21) Appl. No.: 16/690,776

(22) Filed: Nov. 21, 2019

(65) Prior Publication Data

US 2020/0189490 A1 Jun. 18, 2020

(30) Foreign Application Priority Data

Dec. 12, 2018 (KR) ........................ 10-2018-0159588

(51) Int. Cl.
*B60R 13/02* (2006.01)
*B60J 5/04* (2006.01)
*B60J 5/06* (2006.01)
*E05D 15/06* (2006.01)

(52) U.S. Cl.
CPC ......... *B60R 13/0243* (2013.01); *B60J 5/0479* (2013.01); *B60J 5/06* (2013.01); *E05D 15/0686* (2013.01)

(58) Field of Classification Search
CPC .................................................... B60J 5/0479
See application file for complete search history.

(56) References Cited

U.S. PATENT DOCUMENTS

| 2,919,460 | A | * | 1/1960 | Arnold, Jr. | E05D 3/147 16/250 |
| 5,632,065 | A | * | 5/1997 | Siladke | B60J 5/0479 16/335 |
| 8,794,688 | B2 | * | 8/2014 | Mather | B60J 5/06 296/78.1 |
| 9,108,578 | B2 | * | 8/2015 | Choi | B60R 13/0243 |
| 10,494,847 | B1 | * | 12/2019 | Phillip | E05D 15/0686 |

(Continued)

FOREIGN PATENT DOCUMENTS

| FR | 2911627 A1 | * | 7/2008 | ......... E05D 15/0652 |
| KR | 101439011 B1 | * | 9/2014 | ............. B60J 5/047 |

(Continued)

*Primary Examiner* — Marcus Menezes
(74) *Attorney, Agent, or Firm* — Lempia Summerfield Katz LLC

(57) ABSTRACT

A structure of a sliding trim cover is for opposite sliding doors and includes: a center rail mounted at a center inside the opposite sliding doors in a longitudinal direction of a vehicle body; a trim unit including an upper trim and a lower trim to surround the center rail to prevent the center rail from being exposed to the outside; an opening between the upper trim and the lower trim; a center roller, which includes a fixing unit and a rolling unit, the center roller being coupled to the center rail through the opening; and a sliding trim cover with one end connected to the rolling unit. The sliding trim cover slides in parallel with the center rail to open or close the opening when the door is opened or closed. The sliding trim cover opens the opening when the door is opened and completely closes the opening when the door is closed.

6 Claims, 5 Drawing Sheets

(56) References Cited

U.S. PATENT DOCUMENTS

| | | | |
|---|---|---|---|
| 10,633,908 B1* | 4/2020 | Loeb | E05F 15/643 |
| 2004/0094991 A1* | 5/2004 | Fushimi | E05D 15/101 |
| | | | 296/155 |
| 2009/0199480 A1* | 8/2009 | Ehrhard | B60J 5/0412 |
| | | | 49/212 |
| 2011/0047882 A1* | 3/2011 | Thota | B60R 13/0243 |
| | | | 49/404 |
| 2012/0280532 A1* | 11/2012 | Bisinger | B60R 13/0243 |
| | | | 296/146.7 |
| 2017/0089110 A1* | 3/2017 | Tavakoli-Targhi | B60R 13/0243 |

FOREIGN PATENT DOCUMENTS

| | | | |
|---|---|---|---|
| KR | 101439011 B1 | 9/2014 | |
| WO | WO-2014112372 A1 * | 7/2014 | E05D 15/0652 |

* cited by examiner

STRUCTURE OF A SLIDING TRIM COVER FOR OPPOSITE SLIDING DOORS

CROSS-REFERENCE TO RELATED APPLICATIONS

This application claims priority under 35 U.S.C. § 119 to Korean Patent Application No. 10-2018-0159588, filed on Dec. 12, 2018, in the Korean Intellectual Property Office, the disclosure of which is incorporated herein by reference in its entirety.

BACKGROUND

1. Field of the Disclosure

The present disclosure relates to a structure of a sliding trim cover for opposite sliding doors, and particularly, to a structure of a sliding trim cover for opposite sliding doors which allows an opening between an upper trim and a lower trim to be opened or closed together when the opposite sliding doors are opened or closed.

2. Description of the Related Art

In general, in the case of a passenger vehicle, doors of a vehicle include a front door installed at a front side in a longitudinal direction of the vehicle and a rear door installed at a rear side in the longitudinal direction of the vehicle. The front door and the rear door are typically installed on the vehicle body so as to be rotatable by means of hinges.

However, in the case of a van in which many persons may be seated, the occupant compartment opening/closing doors may slide forward and rearward in in opposite directions in the longitudinal direction of the vehicle to open or close the occupant compartment.

Recently, a necessity of completely opening, i.e., unblocking, a door opening to allow a disabled person to be easily seated in a vehicle or to make it easy to load articles into the vehicle through the opening has become a serious issue. It is necessary to operate the door in a narrow space and, as a result, such sliding doors are required to be installed in general passenger vehicles as well as vans.

A trim structure is installed on the sliding door in order to block outside wind noise and road noise and ensure watertight performance.

In this regard, Korean Patent No. 10-1439011 (Invisible Sliding Door Trim Structure) in the related art relates to an invisible sliding door trim and discloses a trim structure. The trim structure includes: a luggage trim part, i.e., a luggage trim, which is provided at one side of a vehicle body opening opened or closed by a vehicle door and has an accommodation space that extends in a horizontal direction; a sliding trim part, i.e., a sliding trim, which is provided inside the door and slides along the accommodation space of the luggage trim in accordance with an opening/closing operation of the door; and a rotating tri part, i.e., a rotating trim, which is provided to be rotatable with respect to the sliding trim in accordance with the opening/closing operation of the door.

However, the related art has a structure in which the sliding door trim is entirely sealed, such that a center roller cannot move relative to a center rail if the center rail is mounted on the door. An opening needs to be formed in the sliding door trim to enable the center roller to move relative to the center rail. This causes a problem in that it is impossible to block noise and ensure watertight performance.

SUMMARY

The present disclosure has been made in an effort to provide a structure of a sliding trim cover for opposite, i.e., opposed sliding doors. The sliding trim cover has one end connected to a center roller mounted on a vehicle body and is applied to a trim structure of a sliding door in the related art, such that an opening is formed to enable the center roller to move relative to a center rail. The opening is also opened or closed when the door is opened or closed.

An embodiment of the present disclosure provides a structure of a sliding trim cover for opposite sliding doors. The structure includes: a center rail, which is mounted at a center inside the opposite sliding doors in a longitudinal direction of a vehicle body. The structure also includes a trim unit, which includes an upper trim part, i.e., an upper trim and a lower trim part, i.e., a lower trim mounted on the door so as to surround the center rail at upper and lower sides of the center rail in order to prevent the center rail from being exposed to the outside. The structure also includes an opening, which is a vacant space formed between the upper trim and the lower trim and a center roller, which includes a fixing unit mounted on the vehicle body and a rolling unit coupled to the center rail to move the center rail. The center roller is coupled to the center rail through the opening such that the center roller moves relative to the center rail. The structure also includes a sliding trim cover which, has one end connected to one side of the rolling unit such that the sliding trim cover slides in parallel with the center rail at a lower side of the center rail to open or close the opening when the door is opened or closed. The sliding trim cover opens the opening when the door is opened and the sliding trim cover completely closes the opening when the door is closed.

The structure may further include: a lower rail, which is mounted at a lower side of the vehicle body in the longitudinal direction of the vehicle body; and a lower roller, which is mounted at a lower side inside the door and moves along the lower rail.

The doors may include a front door and a rear door. The pair of center rails, the pair of center rollers, the pair of lower rails, and the pair of lower rollers may be mounted symmetrically, such that the front door and the rear door may be opened in opposite directions.

The sliding trim cover may further include a groove-shaped guide rail, which includes an upper trim groove formed at a lower side inside the upper trim and a lower trim groove formed at an upper side of the lower trim in order to guide the sliding trim cover along a movement route. The sliding tri cover may also include a blinder, which has one end connected to one side of the rolling unit, and has one side coupled to the upper trim groove and the other side coupled to the lower trim groove. The blinder may be compressed or extended along the guide rail when the door is opened or closed.

An inner surface of the blinder may be formed to have concave/convex portions, such that the concave/convex portions may be collapsed or bent when the door is opened, and such that the concave/convex portions may be extended when the door is closed.

The upper trim groove of the guide rail may be continuously formed in the upper trim in a direction parallel to the center rail along the opening. The lower trim groove of the guide rail may be continuously formed in the lower trim in the direction parallel to the center rail along the opening.

The guide rail may extend to an upper side of the center rail along a lateral edge of the upper trim so as to move the blinder to the upper side when the door is completely opened.

When the door is completely opened, the blinder may move to the upper side of the center rail along the guide rail, such that the blinder does not deviate from the guide rail without being exposed to the outside of the trim unit.

The sliding trim cover may further include a blinder, which is connected to one side of the rolling unit and moves in a direction parallel to the center rail inside the upper trim when the door is opened or closed. The sliding trim cover may also include a coil spring, which is mounted at one side inside the upper trim, winds the blinder around a shaft having elastic restoring force, and moves the blinder.

When the door is completely opened, the blinder may be wound by the coil spring and may move to the upper side of the center rail along a lateral edge of the upper trim, such that the blinder does not deviate out of the opening without being exposed to the outside of the trim unit.

According to the present disclosure configured as described above, there is an advantage in that the center rail is mounted on the door instead of the vehicle body, such that an internal space may be utilized, and the center rail is not exposed to the outside.

According to the present disclosure, there is an advantage in that a rail is removed from an upper side of the vehicle body, such that the device may also be utilized for a general passenger vehicle other than a box-shaped vehicle or a van.

According to the present disclosure, there is an advantage in that the sliding trim cover has one end connected to the center roller mounted on the vehicle body and as a result, the center roller may move relative to the center rail.

According to the present disclosure, there is an advantage in that the opening is also closed when the door is closed and, as a result, there is neither contamination nor risk caused when an occupant's hand is inserted into the opening.

DETAILED DESCRIPTION OF THE EMBODIMENTS

Figure 1:
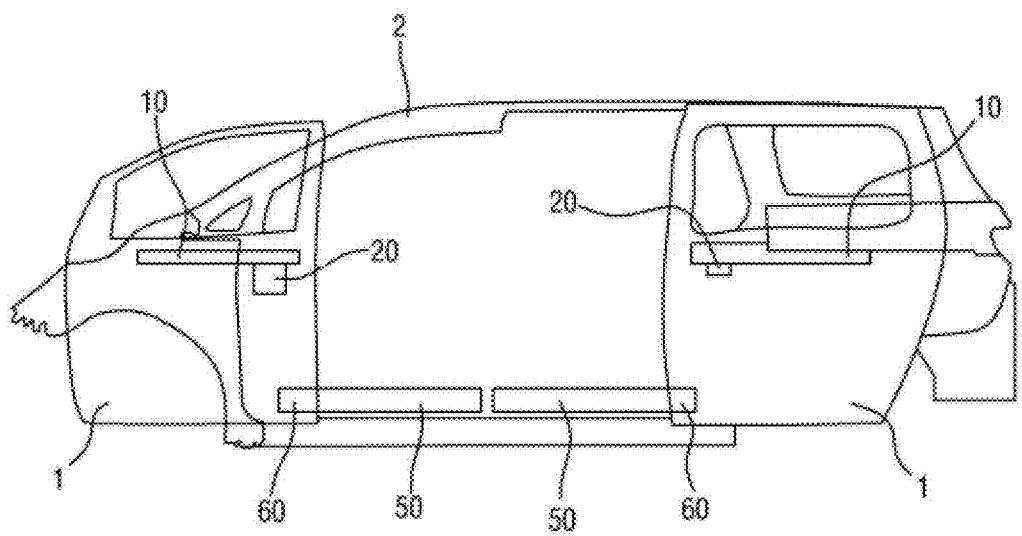
FIG. 1 is a view illustrating a state in which opposite sliding doors according to the present disclosure are mounted on a vehicle body.

Hereinafter, the present disclosure is described in detail with reference to the accompanying drawings. However, the present disclosure is not restricted or limited by the disclosed embodiments. Like reference numerals indicated in the respective drawings refer to components, which perform substantially the same functions.

An object and an effect of the present disclosure may be naturally understood or may become clearer from the following description. The object and the effect of the present disclosure are not restricted only by the following description. In addition, in the description of the present disclosure, the specific descriptions of publicly known technologies related with the present disclosure have been omitted when it is determined that the specific descriptions may unnecessarily obscure the subject matter of the present disclosure.

FIG. 1 illustrates a state in which opposite sliding doors 1 according to the present disclosure are mounted on a vehicle body 2.

Referring to FIG. 1, opposite sliding doors 1 according to the present disclosure include a front door and a rear door, and may include center rails 10, center rollers 20, lower rails 50, and lower rollers 60.

The center rail 10 may be mounted at a center inside the door 1 in a longitudinal direction of the vehicle body 2. Since the center rail 10 is mounted inside the door 1, the center rail 10 may not be exposed to the outside when the door 1 of the vehicle is closed, unlike a center rail in the related art.

In the case of a front door in the related art, there is no space for mounting the center rail on the vehicle body. As a result, there is a problem in that sliding doors, which are opened or closed in opposite directions, cannot be implemented. However, according to the present disclosure, since the center rail 10 is mounted on the door 1, not only the rear door but also the front door may be configured to be slidable, such that the front door and the rear door may be opened in opposite directions.

The center roller 20 is mounted on and fixed to the vehicle body 2 at a corresponding position so that the center roller 20 may be coupled to the center rail 10, thereby enabling the center rail 10 to move when the door 1 is opened or closed.

The center roller 20 may include a fixing unit 21, which is mounted on and fixed to the vehicle body 2, and may include a rolling unit 23, which is coupled to the center rail 10 to move the center rail 10. The center roller 20 may include a bearing for a rolling movement.

The lower rail 50 may be mounted at a lower side of the vehicle body 2 in the longitudinal direction of the vehicle body 2. The lower roller 60 is mounted at a lower side inside the door 1 at a corresponding position so that the lower roller 60 may be coupled to the lower rail 50. The lower roller 60 may move along the lower rail 50 when the door 1 is opened or closed.

The pair of center rails 10, the pair of center rollers 20, the pair of lower rails 50, and the pair of lower rollers 60 are mounted symmetrically so that the front door and the rear door may be opened in opposite directions. A rail and a roller at an upper side, which are applied to a box-shaped vehicle in the related art, are removed. As a result, the sliding doors may be applied to vehicles other than the box-shaped vehicle.

Figure 2A:
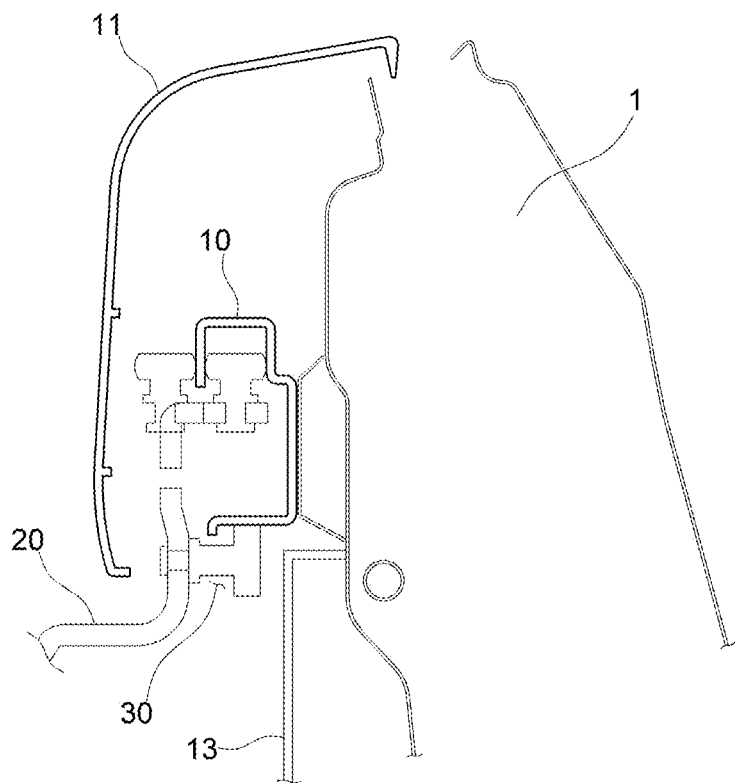
FIG. 2A is a side cut-away view of the opposite sliding doors in which a structure of a sliding trim cover for the opposite sliding doors according to the present disclosure is not mounted.
Figure 2B:
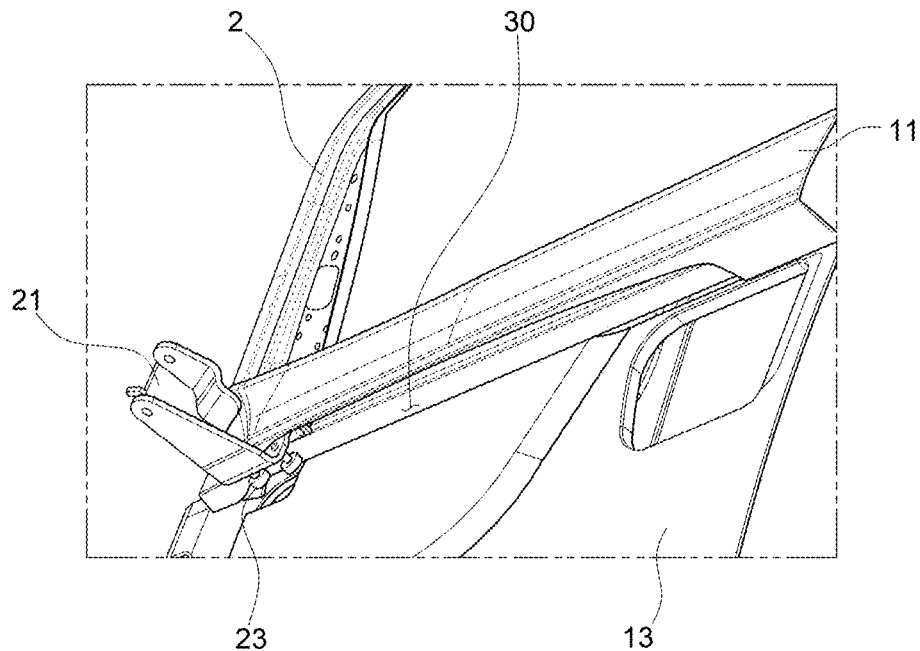
FIG. 2B is a perspective view of the opposite sliding doors in which the structure of the sliding trim cover for the opposite sliding doors according to the present disclosure is not mounted.

FIG. 2A illustrates a side cut-away view of the opposite sliding doors 1 in which a structure of a sliding trim cover 40 for the opposite sliding doors 1 according to the present disclosure is not mounted. FIG. 2B illustrates a perspective view of the opposite sliding doors 1 in which the structure of the sliding trim cover 40 for the opposite sliding doors 1 according to the present disclosure is not mounted.

Referring to FIGS. 2A and 2B, the structure of the sliding trim cover 40 for the opposite sliding doors 1 according to the present disclosure may further include a trim unit and an opening 30.

The trim unit may include an upper trim part, i.e., an upper trim 11 and a lower trim part, i.e., a lower trim 13 for preventing the center rail 10 formed in a '⊏' shape from being exposed to the outside. The upper trim 11 may be mounted on the door 1 at an upper side of the center rail 10 so as to surround the center rail 10. The lower trim 13 may be mounted on the door 1 at a lower side of the center rail 10 so as to surround the center rail 10.

Because the center roller 20 according to the present disclosure needs to move relative to the center rail 10 mounted on the door 1, the trim unit cannot be completely closed and thus includes the opening 30, which is a vacant space between the upper trim 11 and the lower trim 13.

Therefore, the center roller 20 is coupled to the center rail 10 having a '⊏'-shaped lateral side through the opening 30. The center roller 20 may move relative to the center rail 10 when the door 1 is opened or closed.

Accordingly, in a case in which the door 1 is opened or closed with the opening 30 remaining opened, outside wind noise, road noise, and the like cannot be blocked, and a problem with water tightness occurs. As a result, there is a high risk that an occupant's hand may be caught into the opening 30. These issue may cause contamination and a problem with safety.

Therefore, to solve the aforementioned problems, the sliding trim cover 40 according to the present disclosure may be applied to open or close the opening 30 as the door 1 is opened or closed.

Figure 3A:
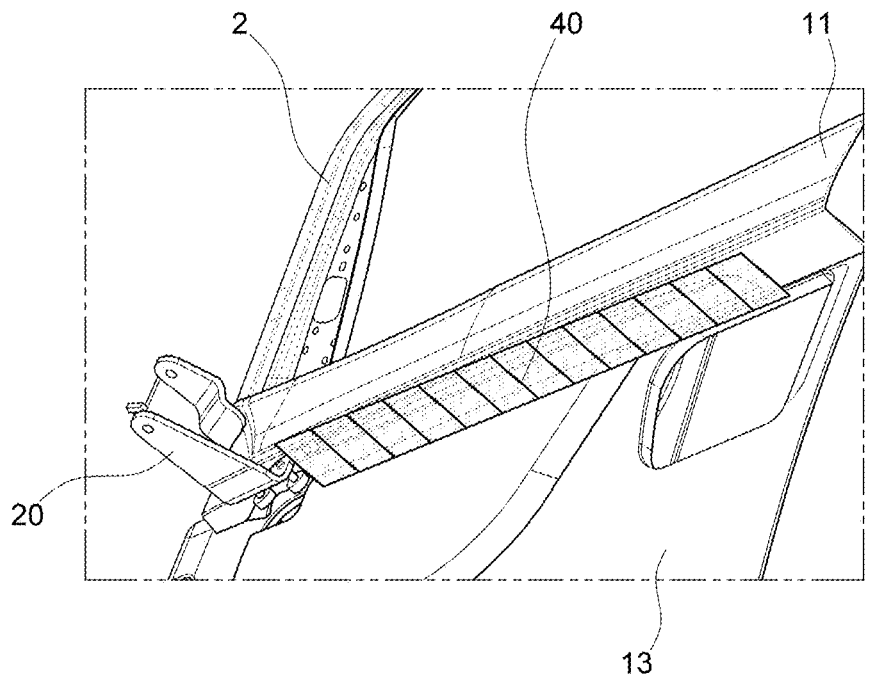
FIG. 3A is a view illustrating the structure of the sliding trim cover for the opposite sliding doors according to the present disclosure in a case in which the door is closed.
Figure 3B:
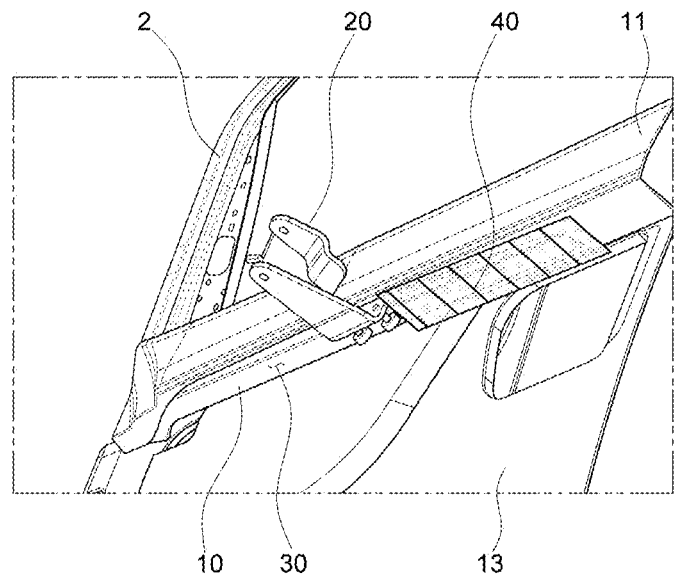
FIG. 3B is a view illustrating the structure of the sliding trim cover for the opposite sliding doors according to the present disclosure in a case in which the door is being opened.
Figure 3C:
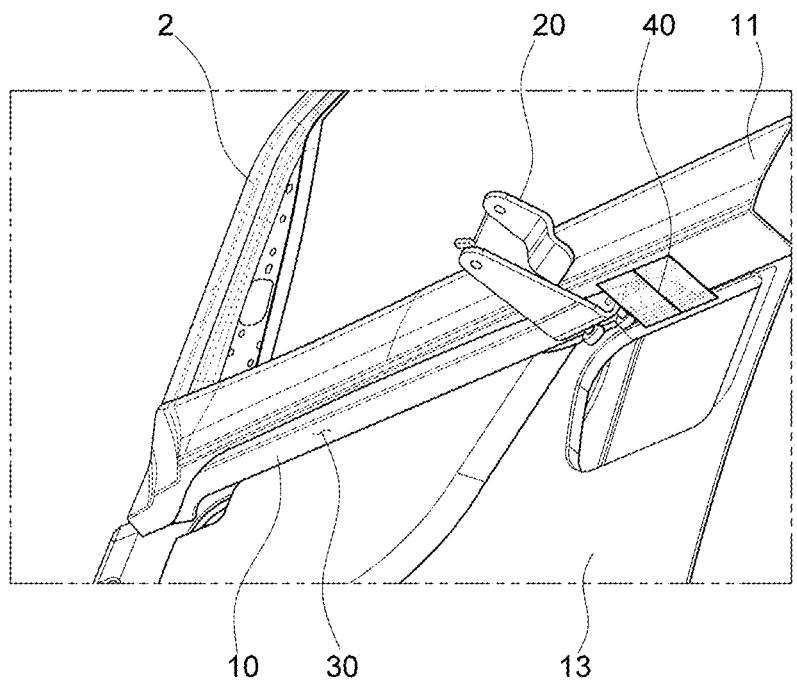
FIG. 3C is a view illustrating the structure of the sliding trim cover for the opposite sliding doors according to the present disclosure in a case in which the door is completely opened.

FIG. 3A illustrates the structure of the sliding trim cover 40 for the opposite sliding doors 1 according to the present disclosure in a case in which the door 1 is closed. FIG. 3B illustrates the structure of the sliding trim cover 40 for the opposite sliding doors 1 according to the present disclosure in a case in which the door 1 is being opened. FIG. 3C illustrates the structure of the sliding trim cover 40 for the opposite sliding doors 1 according to the present disclosure in a case in which the door 1 is completely opened.

Referring to FIGS. 3A-3C, one end of the sliding trim cover 40 according to the present disclosure is connected to one side of the rolling unit 23, such that the sliding trim cover 40 slides in parallel with the center rail 10 at the lower side of the center rail 10 when the door 1 is opened or closed. The sliding trim cover 40 may open the opening 30 when the door 1 is opened. The sliding trim cover 40 may completely close the opening 30 when the door 1 is closed.

In more detail, one end of the sliding trim cover 40 is connected to the center roller 20. The other end of the sliding trim cover 40 is fixed inside the upper trim 11. The sliding trim cover 40 is formed to have a length and a width to completely close the opening 30.

Referring to FIG. 3A, in the case in which the door 1 is closed, the sliding trim cover 40 completely closes the opening 30. The sliding trim cover 40 thus blocks outside wind noise, road noise, and the like, seals the opening 30 in a watertight manner, and prevents a risk that the occupant's hand is caught into the opening 30. Again, these issues would otherwise cause contamination or a problem with safety.

Referring to FIG. 3B, the sliding trim cover 40 slides along with the relative movement of the center roller 20 in the case in which the door 1 is being opened. The sliding trim cover 40 completely opens the opening 30, as illustrated in FIG. 3C, in the case in which the door 1 is completely opened.

In the case in which the door 1 is completely opened, it is not necessary to block noise and the occupant's hand cannot be caught into the opening 30. As a result, it is acceptable if the opening 30 is opened, as illustrated in FIG. 3C.

Figure 4A:
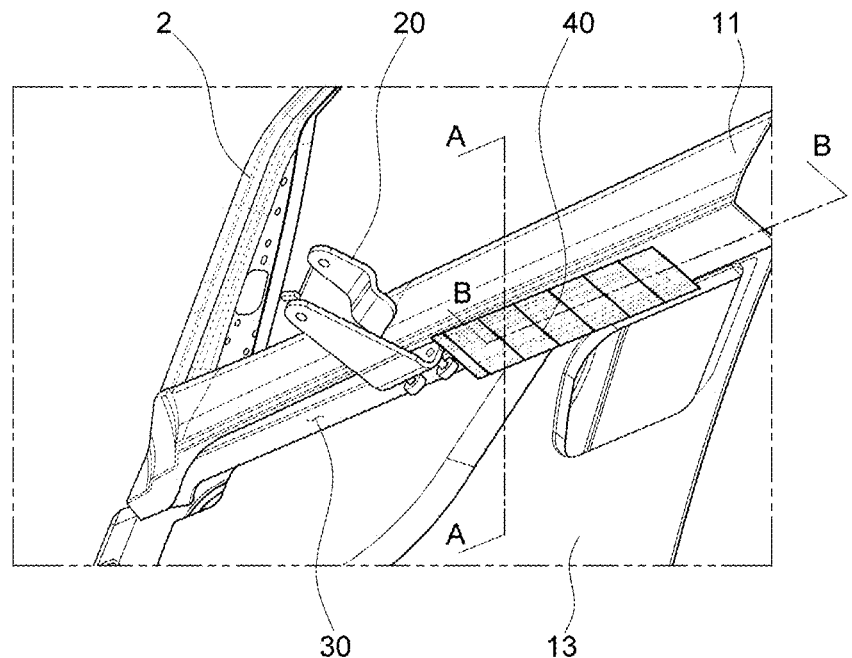
FIG. 4A is a view illustrating the structure of the sliding trim cover for the opposite sliding doors according to the present disclosure in a case in which the door is being opened.
Figure 4B:
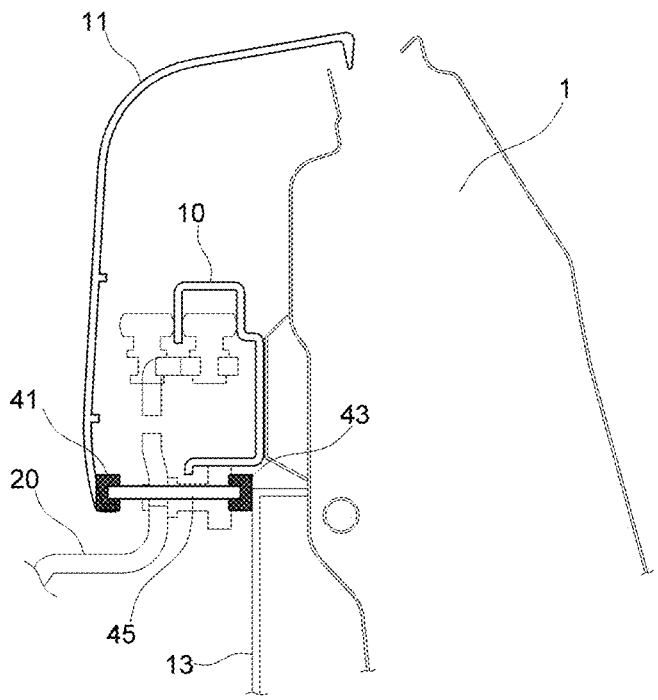
FIG. 4B is a view illustrating a cross-section A-A in FIG. 4A.
Figure 4C:
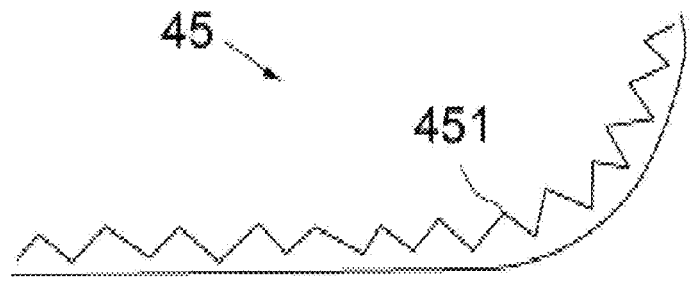
FIG. 4C is a view illustrating a cross-section B-B in FIG. 4A.
Figure 5A:
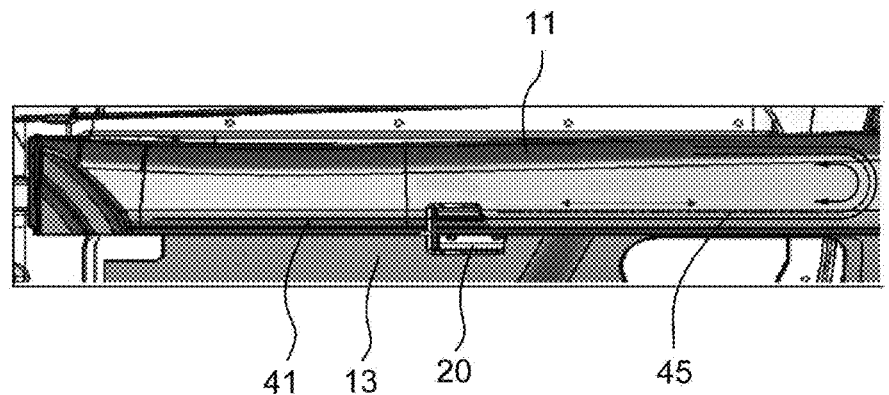
FIG. 5A is a view illustrating a guide rail and a blinder according to the embodiment of the present disclosure.

FIG. 4A illustrates the structure of the sliding trim cover 40 for the opposite sliding doors 1 according to the present disclosure in the case in which the door 1 is being opened. FIG. 4B illustrates a cross-section A-A in FIG. 5A and FIG. 4C illustrates a cross-section B-B in FIG. 5A.

Referring to FIG. 4B, the sliding trim cover 40 according to the present disclosure may include a guide rail and a blinder 45.

The guide rail serves to guide the sliding trim cover 40 along a movement route. The guide rail includes an upper trim groove 41, which is formed at a lower side inside the upper trim 11, and a lower trim groove 43, which is formed at an upper side of the lower trim 13.

The upper trim groove 41 may be continuously formed in the upper trim 11 along the opening 30 in a direction parallel to the center rail 10. The lower trim groove 43 may also be continuously formed in the lower trim 13 along the opening 30 in the direction parallel to the center rail 10.

One end of the blinder 45 is connected to one side of the rolling unit 23, such that the blinder 45 may move along with the relative movement of the rolling unit 23. In addition, one side of the blinder 45 is coupled to the upper trim groove 41 and the other side of the blinder 45 is coupled to the lower trim groove 43, such that the blinder 45 may be compressed or extended along the guide rail when the door 1 is opened or closed.

Since the guide rail is continuously formed along the opening 30, the blinder 45 may move without deviating from the guide rail.

Referring to FIG. 4C, an inner surface of the blinder 45 may be formed to have concave/convex portions 451. Therefore, when the door 1 is opened, the overall length of the blinder 45 may be decreased as the concave/convex portions 451 are collapsed or bent. When the door 1 is closed, the overall length of the blinder 45 may be increased as the concave/convex portions 451 are extended.

As illustrated in FIG. 4C, the concave/convex portion 451 may have a groove having a triangular shape, or the concave/convex portion 451 may be formed in other shapes.

FIG. 5A illustrates the guide rail and the blinder 45 according to the embodiment of the present disclosure.

Referring to FIG. 5A, the upper trim groove 41 of the guide rail is formed inside the upper trim 11. The lower trim groove 43 of the guide rail is formed outside the lower trim 13. The guide rail may extend to the upper side of the center rail 10 along a lateral edge of the upper trim 11 so as to move the blinder 45 to the upper side when the door 1 is completely opened.

Therefore, when the door 1 is completely opened, the blinder 45 moves to the upper side of the center rail 10 along the guide rail, such that the blinder 45 does not deviate from the guide rail without being exposed to the outside of the trim unit.

Figure 5B:
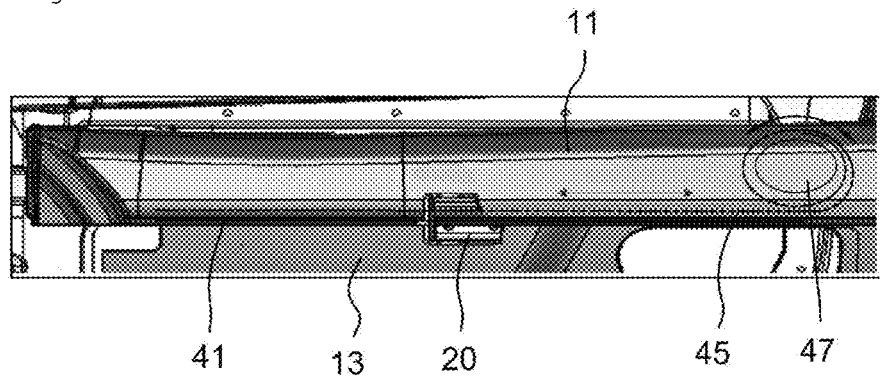
FIG. 5B is a view illustrating a coil spring and the blinder according to the embodiment of the present disclosure.

FIG. 5B illustrates a coil spring 47 and the blinder 45 according to the embodiment of the present disclosure.

Referring to FIG. 5B, the sliding trim cover 40 according to the present disclosure may include the blinder 45 and the coil spring 47.

The blinder 45 is connected to one side of the rolling unit 23 and moves in the direction parallel to the center rail 10 inside the upper trim 11 when the door 1 is opened or closed. The blinder 45 may be moved by the coil spring 47, which is mounted at one side inside the upper trim 11 and winds the blinder 45 around a shaft having elastic restoring force.

The coil spring 47 enables the blinder 45, which is extended when the door 1 is closed, to be wound by the elastic restoring force of the shaft from when the door 1 begins to be opened.

In the case in which the door 1 is completely opened, the blinder 45 is wound by the coil spring 47 and moved to the upper side of the center rail 10 along the lateral edge of the upper trim 11, such that the blinder 45 may not deviate out of the opening 30 without being exposed to the outside of the trim unit.

While the present disclosure has been described in detail above with reference to the representative embodiment, those having ordinary skill in the art to which the present disclosure pertains will understand that the embodiment may be variously modified without departing from the scope of the present disclosure. Accordingly, the scope of the present disclosure should not be limited to the described embodiment but should instead be defined not only by the appended claims but also by all changes or modified forms induced from an equivalent concept to the claims.

What is claimed is:

1. A structure of a sliding trim cover for a door, the door being an opposing sliding door, the structure comprising:
   a center rail, which is mounted at a center inside the door in a longitudinal direction of a vehicle body;
   a trim unit, which includes an upper trim and a lower trim mounted on the door so as to surround the center rail at upper and lower sides of the center rail in order to prevent the center rail from being exposed to an outside of the door;
   an opening, which is a vacant space formed between the upper trim and the lower trim;
   a center roller, which includes a fixing unit mounted on the vehicle body and a rolling unit coupled to the center rail to move the center rail, the center roller being coupled to the center rail through the opening such that the center roller moves relative to the center rail;
   the sliding trim cover having one end connected to one side of the rolling unit such that the sliding trim cover slides in parallel with the center rail at a lower side of the center rail to open or close the opening when the door is opened or closed;
   a lower rail, which is mounted at a lower side of the vehicle body in the longitudinal direction of the vehicle body; and
   a lower roller, which is mounted at a lower side inside the door and moves along the lower rail,
   wherein the sliding trim cover opens the opening when the door is opened, and the sliding trim cover completely closes the opening when the door is closed,
   wherein the door includes a front door and a rear door, and wherein the center rail includes a pair of center rails, the center roller includes a pair of center rollers, the lower rail includes a pair of lower rails, and the lower roller includes a pair of lower rollers mounted symmetrically, such that the front door and the rear door are opened in opposing directions, and
   wherein the sliding trim cover includes
      a groove-shaped guide rail, which includes an upper trim groove formed at a lower side inside the upper trim and a lower trim groove formed at an upper side of the lower trim in order to guide the sliding trim cover along a movement route,
      a blinder, which has one end connected to one side of the rolling unit, which has one side coupled to the upper trim groove and the other side coupled to the lower trim groove, the blinder being compressed or extended along the guide rail when the door is opened or closed, and which is connected to one side of the rolling unit and moves in a direction parallel to the center rail inside the upper trim when the door is opened or closed, and
      a coil spring, which is mounted at one side inside the upper trim, winds the blinder around a shaft having elastic restoring force, and moves the blinder.

2. The structure of claim 1, wherein an inner surface of the blinder is formed to have concave/convex portions, such that the concave/convex portions are collapsed or bent when the door is opened, and the concave/convex portions are extended when the door is closed.

3. The structure of claim 1, wherein the upper trim groove of the guide rail is continuously formed in the upper trim in a direction parallel to the center rail along the opening, and wherein the lower trim groove of the guide rail is continuously formed in the lower trim in the direction parallel to the center rail along the opening.

4. The structure of claim 3, wherein the guide rail extends to the upper side of the center rail along a lateral edge of the upper trim so as to move the blinder to the upper side when the door is completely opened.

5. The structure of claim 4, wherein, when the door is completely opened, the blinder moves to the upper side of the center rail along the guide rail, such that the blinder does not deviate from the guide rail without being exposed to the outside of the trim unit.

6. The structure of claim 1, wherein, when the door is completely opened, the blinder is wound by the coil spring and moves to the upper side of the center rail along a lateral edge of the upper trim, such that the blinder does not deviate out of the opening without being exposed to the outside of the trim unit.

* * * * *